Figure 1:
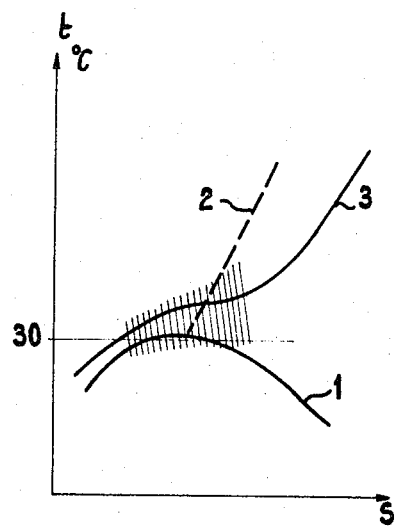

3,324,652
PROCESS AND APPARATUS FOR POWER PRODUCTION
Ennemond Maillet, Paris, France, assignor to Commissariat à l'Energie Atomique, Paris, France
Filed July 7, 1965, Ser. No. 470,034
Claims priority, application France, July 8, 1964, 981,028
5 Claims. (Cl. 60—36)

This invention relates to a process for power production by recovery of the heat evolved in a gas-cooled nuclear reactor and to a system for performing the process or a similar process.

The invention is applicable more particularly to those installations in which pressurised $CO_2$ is used to cool the reactor and is used directly as a driving fluid in a gas turbine. Installations of this kind are very advantageous since they combine the advantages of gas turbines with the simplicity and high efficiency of single-loop circuits. However, the conventional gas turbine cycle has a number of disadvantages for nuclear uses and so cannot, as a general rule, be used effectively. The main reason for the disadvantages is the need for gas turbines to work at high temperatures and pressures if they are to have a satisfactory efficiency, but maximum temperatures and pressures are limited by the strength of the various constituent parts of the reactor.

The present invention obivates all these disadvantages while retaining the advantages of gas turbines using a reactor coolant as driving fluid. For example, the invention helps to reconcile the high pressures required for satisfactory turbine performance with the limitations imposed by the reactor. The invention also dissociates the high temperatures permissible for the reactor and conducive to good turbine performance from high pressure, so that the power absorbed by compression of the driving fluid can be reduced.

The invention accordingly provides a process for power production by recovery of the heat evolved in a pressure $CO_2$ cooled nuclear reactor wherein the $CO_2$ flows in a closed circuit between the reactor and at least one gas turbine and then experiences in sequence a compression to a pressure of from 120 to 250 bars, a first expansion to a pressure of from 40 to 120 bars, further heating in the reactor, a second expansion in the turbine, and a cooling by heat exchange with a cold source.

Since the critical temperature of $CO_2$ is 31° C., compression (or at least most of the compression in cases where compression is performed in two or more stages) can be performed in initial conditions corresponding to the super-critical zone near the saturation curve, so as to give very good efficiency. Using a very high gas pressure after high compression (between 120 and 250 bars) also helps towards very high efficiency.

Advantageously, the lowest pressure in the cycle—i.e., the gas pressure after the second expansion—is above 15 bars, so that the superficial area and the size of the or each recovery heat exchanger where the expanded gas yields its heat to the compressed gas do not have to be excessively large.

According to a secondary feature of the invention, the process as applied to a liquid-moderated reactor comprises before the first expansion a preheating of at least some of the gas by recovery of some of the heat dissipated in the moderator.

Figure 2:
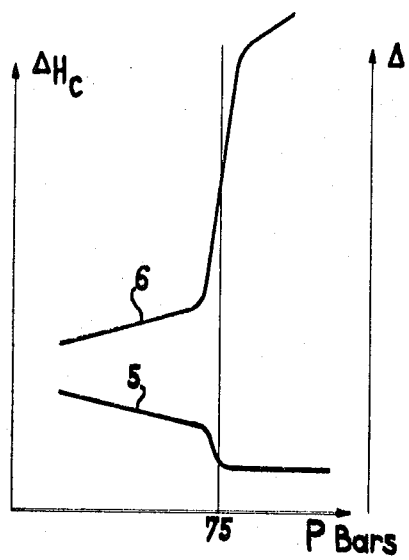
Figure 3:
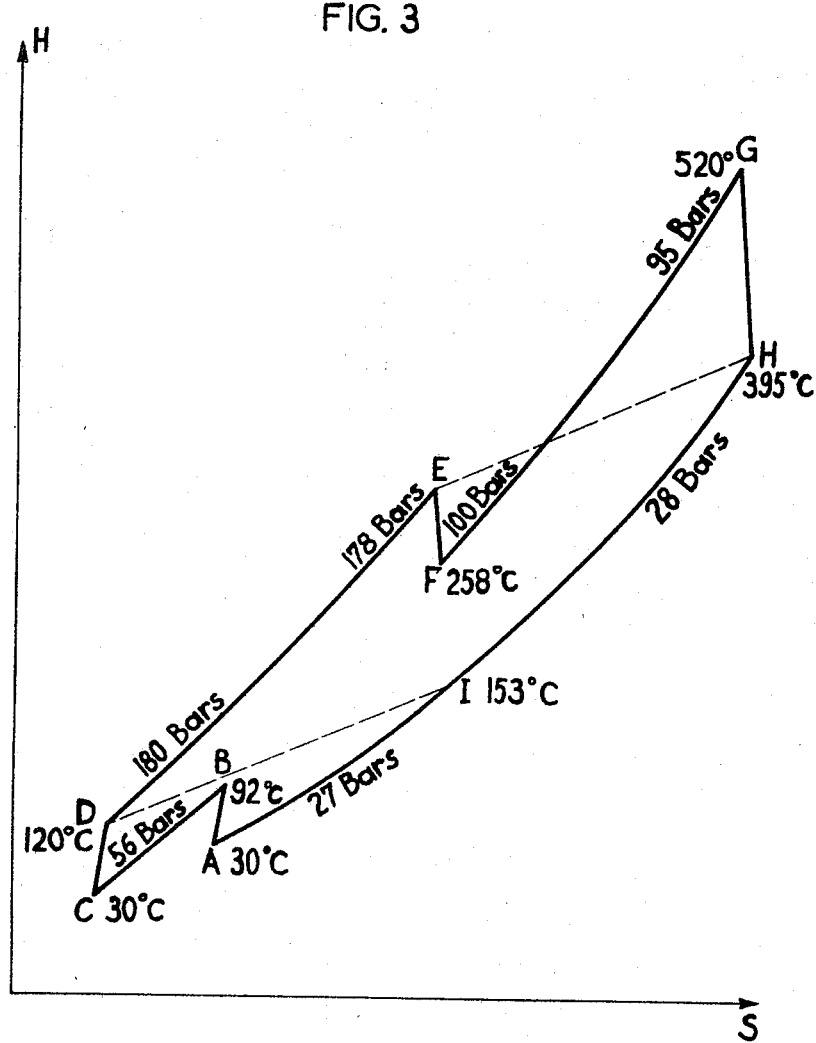
Figure 4:
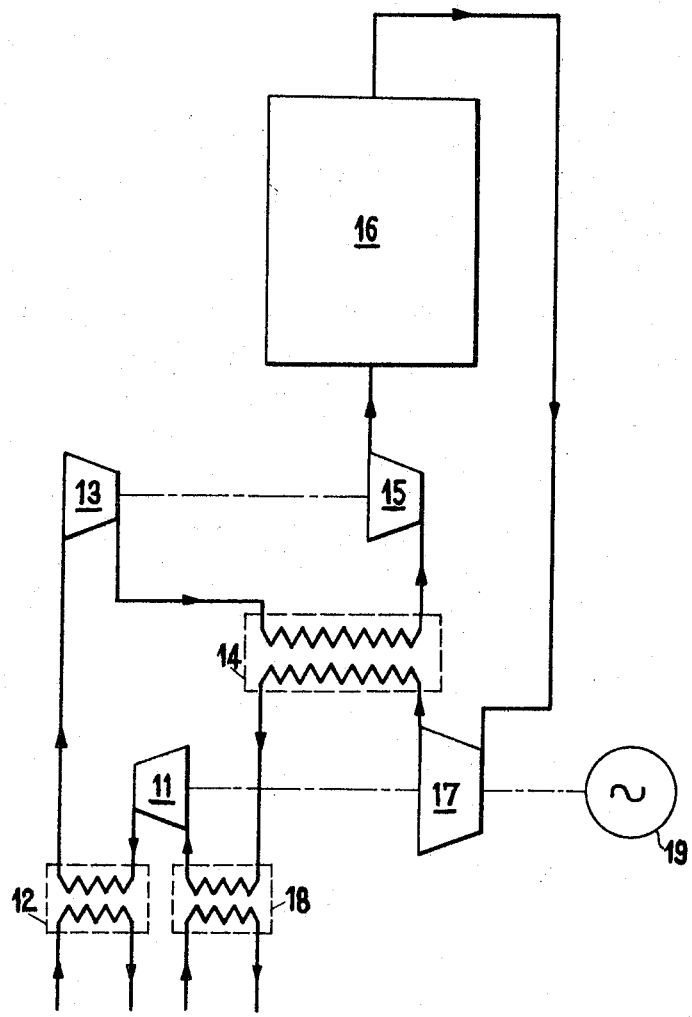
Figure 5:
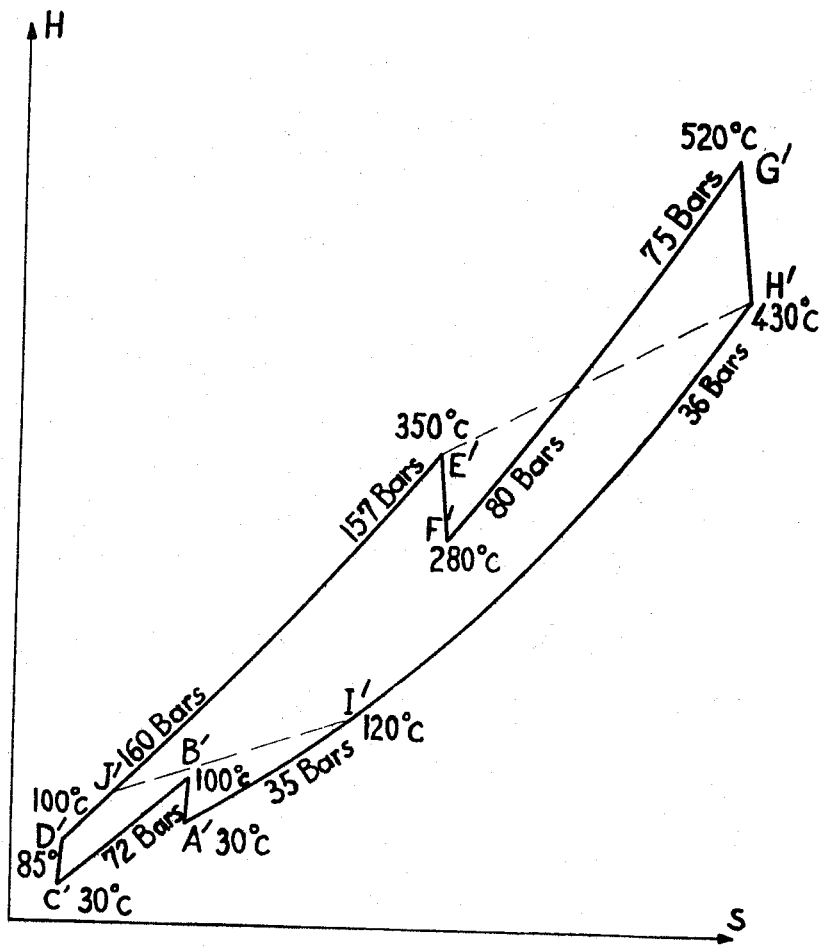
Figure 6:
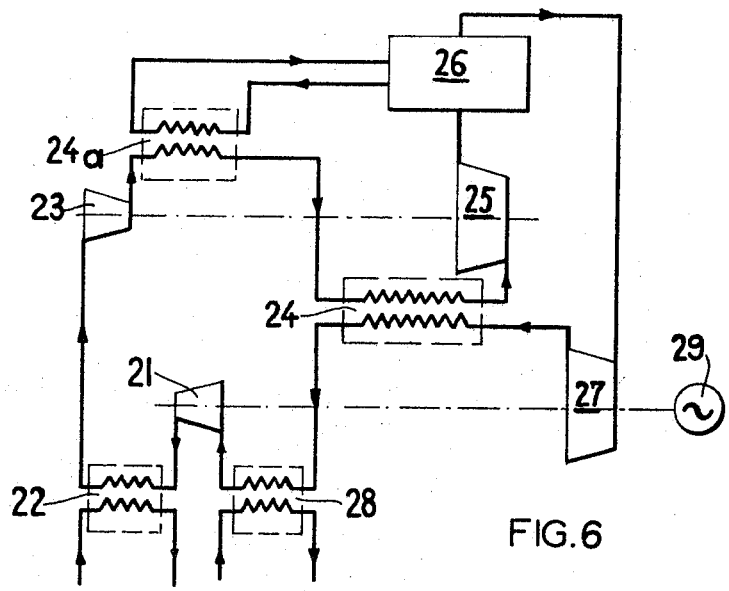
Figure 7:
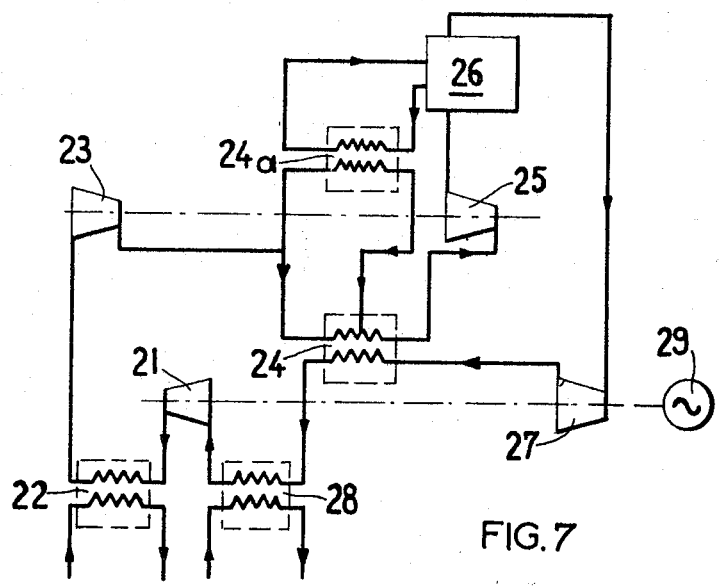

The invention will now be described by way of example with reference to the accompanying drawings wherein:
  FIGURE 1 shows the entropy diagram of $CO_2$;
  FIGURE 2 shows the curves relating variation of the energy of compression and the heat of further heating to pressure;
  FIGURE 3 shows an example of the $CO_2$ cycle according to the invention in an enthalpy-entropy diagram;
  FIGURE 4 is a view in block schematic form of the system used to perform the cycle shown in FIGURE 3;
  FIGURE 5 shows another exemplary $CO_2$ according to the invention in an enthalpy-entropy diagram;
  FIGURE 6 is a block schematic view of a system used to perform the cycle shown in FIGURE 5, and
  FIGURE 7 shows an alternative form of FIGURE 6.

FIGURE 1 is a schematic view of the entropy diagram of $CO_2$ gas near its critical point, the curve 1 being the saturation curve. Also shown are an isochor 2 and the 80-bars isobar 3. The critical temperature is 31° C. In practice, the critical temperature prevents the use of a condensation cycle in average atmospheric conditions, since cooling water whose temperature would not exceed from 15 to 20° C. for most of the year would have to be available. Preferably, therefore, working is performed in the supercritical zone but near the critical state, so as to reduce as far as possible the power absorbed by compression. This also helps to avoid the heat loss associated with condensation.

The critical zone, shown hatched in FIG. 1, is distinguished by rapid variations of the thermodynamic characteristics of the fluid. More particularly, the work of compression varies more rapidly than in the remainder of the diagram when the initial pressure increases—i.e., when the imaginary point moves from right to left in FIG. 1. The same thing can be seen in FIG. 2 where a curve 5 represents the variation of the energy $\Delta Hc$ required for compression in dependence upon the initial pressure for a given compression ratio—approximately 2 to 3 for the particular curve 5 given in FIG. 2. The curve 5 shows that the energy of compression decreases rapidly for an initial pressure near 75 bars but variations are much slower on either side of 75 bars.

A curve 6 in FIG. 2, which is for the same constant compression ratio (approximately 2 to 3) as the curve 5, shows the variations of heat $\Delta Hr$ required to further heat the compressed fluid to a desired temperature e.g. of 250° C. (the reactor entry temperature).

The curve 6 shows that there is an abrupt increase in $\Delta Hr$ near the same initial pressure, before compression, of 75 bars.

The optimum compression pressure for satisfactory overall heat cycle efficiency is therefore the result of a compromise between reducing the energy of compression and reducing the heat of further heating after compression. Actually, the optimum value lies between 50 and 80 bars for the particular case described.

To reduce the energy required for compression, compression is performed in two stages separated by intermediate cooling. The compression ratio for each of the two stages is selected in the light of the considerations just outlined. For instance, in the cycle which is shown in FIG. 3 and which will be described in greater detail hereinafter, the intermediate pressure is taken to be 75 bars, more compression being given in the second stage than in the first stage.

Overall efficiency of course depends greatly upon the ratio between the end pressures of the cycle; as a rule, there is an optimum value for this ratio. However, if the minimum pressure is reduced below about 15 bars, the heat-exchange area required for heat recovery must be increased to an extent which is not readily tolerable. On the other hand, while high pressures e.g. of above 100 bars, cause no difficulties as regards coolers and the recovery exchangers—since the superficial area of the latter can be reduced—present-day reactors cannot withstand high pressures.

Factors to be considered in choosing the best maximum pressure for the cycle are the need to maintain satisfactory temperature differences in the recovery exchanger and to maintain the expansion ratio at a value compatible with such a difference between the fluid temperatures at its entry to and exit from the reactor as is sufficient for satisfactory cooling of the reactor. As an example, an optimising calculation including the various factors just mentioned showed a from 10 to 12% improvement in efficiency for an increase of the maximum pressure from 100 to 200 bars.

According to the invention, the maximum pressure can be this high optimum value of about 200 bars, this figure being reduced to about 100 bars by expansion prior to entry in the reactor.

The diagram which is given in FIG. 3 and in which entropy is plotted along the abscissa and enthalpy along the ordinate, shows by way of example a heat cycle devised in accordance with the considerations hereinbefore set forth. A description will be given with reference to FIG. 4 as well, which is a view in block schematic form of a system for performing the process according to the invention and, more particularly, for performing the cycle shown in FIG. 3. In the case described, the $CO_2$ gas is compressed in two stages. In the first stage the gas pressure is raised from 27 to 56 bars in a low-pressure compressor 11, the imaginary point shifting from point A to point B in FIG. 3. From an initial value of about 30° C. to temperature rises to about 100° C. The gas then goes to an intermediate cooler 12 where it cools down to 30° C. (point C in FIG. 3) by heat exchange with the water forming the cold source.

In a second stage of compression in a high-pressure compressor 13, the pressure is increased from about 56 to 180 bars. Because of the corresponding temperature increase, the gases leave the compressor 13 at a temperature of about 120° C. (point D in the diagram in FIG. 3). The gases from the compressor 13 are then further heated in a recovery exchanger 14 by expanded gas leaving a low-pressure turbine 17. The gases therefore arrive at the entry of a high-pressure turbine 15 at a temperature of about 320° C. and are expanded to 100 bars (from E to F in FIG. 3), the temperature decreasing to 258° C. The gases leaving the turbine 15 then go to a reactor 16 to cool the same, the gas temperature rising from 258 to 520° C. in the reactors. The load loss is such that the gas exit pressure is about 95 bars (point G in FIG. 3). The gas then expands in a low-pressure turbine 17 to a pressure of 28 bars and a temperature of about 395° C. (from G to H in FIG. 3. The gas from the turbine 17 goes to the recovery exchanger 14 and yields much of its heat therein to the compressed gas feeding the high-pressure turbine 15, cooling down to about 153° C. from H to I in FIG. 3). Cooling continues in a water cooler 18 to about 30° C. from I to A in FIG. 3). A new cycle then starts, the cooled gases going to the low-pressure compressor 11.

The turbine 15 where the gas expands prior to entering the reactor drives the high-pressure compressor 13.

The turbine 17 where the main expansion occurs drives an alternator 19 and the low-pressure compressor 11. If the power from the free-reactor-entry expansion is sufficient, the turbine 15 can drive the two compressors 11, 13.

A description will now be given of the diagram in FIG. 5, where entropy is plotted along the abscissa and enthalpy along the ordinate, with reference to FIG. 6 as well which is a view in block schematic form of a system for performing the process according to the invention, more particularly the cycle shown in FIG. 5. In the case being described, the $CO_2$ gas is compressed in two stages. In a first stage the gas pressure is raised from about 35 to 75 bars in a low-pressure compressor 21, the imaginary point shifting from point A' to point B' in FIG. 5. From an initial value of about 30° C. the temperature rises to about 100° C., then goes to an intermediate cooler 22 where it cools down to about 30° C. (point C' in FIG. 5) by heat exchange with the water forming the cold source. A second stage of compression from about 72 to 160 bars is given in a high-pressure compressor 23. Because of the corresponding temperature rise, the gases leave the compressor 23 at a temperature of about 85° C. (point D' in FIG. 5). The gas is further heated (from D' to J' in FIG. 5) by recovery of the heat dissipated in the heavy water supplying the recovery exchanger 24a. At E' the temperature is around 100° C.; the gas then goes through the recovery exchanger 24 supplied by the expanded gas from a low-pressure turbine 27, the gas temperature increasing further to reach about 350° C., at a pressure of about 157 bars, at a place E'. The gases then reach the entry of a high-pressure turbine 25 in which they expand to about 80 bars (from E' to F' in FIG. 5), the temperaturing dropping from 350 to 280° C. The gas then enters a reactor 26 in which the gas temperature rises to 520° C. Because of the load loss, the pressure of the gas at its exit from the reactor is about 75 bars (point J' in FIG. 5).

The gas then expands in the low-pressure turbine 27 to a pressure of about 36 bars and a temperature of about 430° C. (from G' to H' in FIG. 5). The gas leaving the low-pressure turbine 27 goes to the recovery exchanger 24 and yields much of its heat therein to the compressed gases supplying the high-pressure turbine 25. The gas therefore cools down to about 120° C. (from H' to I' in FIG. 5). Cooling continues (from I' to A' in FIG. 5) in the water cooler 28 down to about 30° C. A new cycle then starts, the cooled gases being supplied to the low-pressure compressor 21.

In the embodiment shown in FIG. 7, some of the cooling gas delivered from the high-pressure compressor 23 is further heated by going through the recovery exchanger 24a supplied by the liquid moderator, but the main flow of cooling gas goes directly through the recovery exchanger 24. The fluid leaving the exchanger 24a, returns to the main circuit and goes through some of the exchanger 24 where it is given further heating again.

I claim:

1. A process for power production by the recovery of heat evolved in a pressure $CO_2$ cooled nuclear reactor, wherein the $CO_2$ flows in a closed circuit between the reactor and at least one gas turbine and then experiences in sequence a compression to a pressure of from 120 to 250 bars, a first expansion to a pressure of from 40 to 120 bars, further heating in the reactor, a second expansion in the turbine, and a cooling by heat exchange with a cold source.

2. A process as set forth in claim 1 including before the first expansion, the step of preheating of at least some of the gas by exchange with the gas leaving the second expansion.

3. A process as set forth in claim 1 applied to a moderator comprising a liquid-moderated reactor and including before compression the step of preheating of at least some of the gas by recovery of some of the heat dissipated in the moderator.

4. A process as set forth in claim 3, wherein the proportion of gas which is preheated is given a second preheating by exchange with the gas delivered from the second expansion.

5. A process as set forth in claim 1, wherein the minimum gas pressure after the second expansion is above 15 bars.

References Cited

UNITED STATES PATENTS

| 2,714,289 | 8/1955 | Hofmann | 60—59 |
| 3,218,807 | 11/1965 | Berchtold et al. | 60—36 X |
| 3,237,403 | 3/1966 | Feher | 60—36 |
| 3,252,286 | 5/1966 | Whitelaw | 60—59 |

EDGAR W. GEOGHEGAN, *Primary Examiner.*